United States Patent
Wiacek (10) Patent No.: US 11,792,606 B2
(45) Date of Patent: Oct. 17, 2023

(54) POSITION DETERMINATION

(71) Applicant: Nokia Technologies Oy, Espoo (FI)

(72) Inventor: Fabian Wiacek, Warsaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/253,809

(22) PCT Filed: Jun. 25, 2018

(86) PCT No.: PCT/EP2018/066939
§ 371 (c)(1),
(2) Date: Dec. 18, 2020

(87) PCT Pub. No.: WO2020/001731
PCT Pub. Date: Jan. 2, 2020

(65) Prior Publication Data
US 2021/0204096 A1    Jul. 1, 2021

(51) Int. Cl.
*H04W 4/029* (2018.01)
*G01S 5/10* (2006.01)
(Continued)

(52) U.S. Cl.
CPC ........... *H04W 4/029* (2018.02); *G01S 5/0236* (2013.01); *G01S 5/0284* (2013.01); *G01S 5/10* (2013.01);
(Continued)

(58) Field of Classification Search
CPC ... H04W 4/029; H04W 56/005; H04W 64/00; H04W 64/006
(Continued)

(56) References Cited

U.S. PATENT DOCUMENTS 6,097,959 A    8/2000    Yost et al.
7,359,712 B2   4/2008    Gutowski et al.
(Continued)

FOREIGN PATENT DOCUMENTS

EP    1688757 A2    8/2006
EP    2152030 A1    2/2010
(Continued)

OTHER PUBLICATIONS

"3rd Generation Partnership Project; Technical Specification Group Radio Access Network; Radio Resource Control (RRC); Protocol specification (Release 15)", 3GPP TS 25.331, V15.1.0, Dec. 2017, pp. 1-2316.
(Continued)

*Primary Examiner* — Joseph Arevalo
(74) *Attorney, Agent, or Firm* — Harrington & Smith (57) ABSTRACT

An apparatus and method is disclosed. The apparatus may comprise at least one processor, and at least one memory including computer program code which, when executed by the at least one processor, causes the apparatus to receive at an apparatus, from each of at least three remote base stations, transmitted data comprising a portion indicating the geographic position of the respective base station and a transmission time of a reference signal or data. The apparatus may also be caused to determine the geographic position of the apparatus based on the received geographic positions and the delay between the transmission time and a reception time of the reference signal or data.

20 Claims, 9 Drawing Sheets

(51) Int. Cl.
*G01S 5/02* (2010.01)
*H04W 56/00* (2009.01)
*H04W 64/00* (2009.01)

(52) U.S. Cl.
CPC ....... *H04W 56/005* (2013.01); *H04W 64/006* (2013.01)

(58) Field of Classification Search
USPC ....... 455/418, 446, 509, 522, 447, 558, 101, 455/456.2, 450, 456.5, 427, 424, 456.1
See application file for complete search history.

(56) References Cited

U.S. PATENT DOCUMENTS

| | | | |
|---|---|---|---|
| 9,037,155 B2 | 5/2015 | Fischer et al. | |
| 9,060,342 B2 | 6/2015 | Wu | |
| 9,084,216 B2 | 7/2015 | Chin et al. | |
| 9,295,021 B2 | 3/2016 | Hedley et al. | |
| 9,402,255 B2 | 7/2016 | Löhr et al. | |
| 9,538,494 B2 | 1/2017 | Puthenpura et al. | |
| 9,942,719 B2 | 4/2018 | Bitra et al. | |
| 2010/0081451 A1* | 4/2010 | Mueck | H04W 4/025 455/456.1 |
| 2011/0039578 A1 | 2/2011 | Rowitch et al. | |
| 2011/0117926 A1* | 5/2011 | Hwang | H04W 64/00 455/456.1 |
| 2012/0083278 A1* | 4/2012 | Kazmi | H04W 64/00 455/450 |
| 2012/0184290 A1* | 7/2012 | Kazmi | H04W 64/00 455/456.1 |
| 2012/0208552 A1* | 8/2012 | Siomina | H04W 64/003 455/456.1 |
| 2012/0270572 A1* | 10/2012 | Siomina | G01S 5/0236 455/456.6 |
| 2012/0276916 A1* | 11/2012 | Kazmi | G01S 5/0236 455/450 |
| 2013/0023285 A1* | 1/2013 | Markhovsky | G01S 3/74 455/456.1 |
| 2013/0130710 A1* | 5/2013 | Boyer | G01S 5/04 455/456.1 |
| 2013/0272170 A1* | 10/2013 | Chatterjee | H04W 74/0808 370/280 |
| 2014/0094188 A1* | 4/2014 | Kazmi | H04W 4/023 455/456.1 |
| 2014/0176366 A1 | 6/2014 | Fischer et al. | |
| 2014/0349582 A1 | 11/2014 | Xiao et al. | |
| 2015/0256972 A1* | 9/2015 | Markhovsky | G01S 5/0273 455/456.1 |
| 2016/0150376 A1* | 5/2016 | Chiou | H04W 4/025 455/456.2 |
| 2016/0157053 A1 | 6/2016 | Zhang et al. | |
| 2017/0332208 A1* | 11/2017 | Cardoso de Moura | H04W 24/08 |
| 2018/0011163 A1 | 1/2018 | Han et al. | |
| 2018/0035251 A1 | 2/2018 | Bitra | |
| 2018/0329023 A1 | 11/2018 | Perez-cruz et al. | |
| 2019/0239093 A1* | 8/2019 | Zhang | H04W 72/042 |
| 2020/0329405 A1* | 10/2020 | Awoniyi-Oteri | H04B 7/0408 |
| 2021/0360674 A1* | 11/2021 | Lim | H04L 5/001 |

FOREIGN PATENT DOCUMENTS

| | | |
|---|---|---|
| EP | 3226032 A1 | 10/2017 |
| WO | 03/087869 A1 | 10/2003 |
| WO | 2006/099632 A2 | 9/2006 |
| WO | 2010/110709 A1 | 9/2010 |
| WO | 2013/055694 A1 | 4/2013 |
| WO | 2018/169563 A1 | 9/2018 |
| WO | 2020/104071 A1 | 5/2020 |

OTHER PUBLICATIONS

Bhandare et al., "Positioning of Mobile Station Using Received Signal Strength and Time of Arrival", International Journal of Advanced Research in Computer Engineering & Technology (IJARCET), vol. 1, No. 10, Dec. 2012, pp. 216-218.

Capkun et al., "Secure Positioning in Wireless Networks", IEEE Journal on Selected Areas in Communications, vol. 24, No. 2, Feb. 2006, pp. 1-13.

Schafer et al., "POSTER: Security by Mobility in Location and Track Verification", Proceedings of the 8th ACM Conference on Security & Privacy in Wireless and Mobile Networks, Article No. 29, Jun. 2015, 2 pages.

Perez-Cruz et al., "Blade: A Universal, Blind Learning Algorithm for ToA Localization in NLOS Channels", IEEE Globecom Workshops (GC Wkshps), Dec. 4-8, 2016, 7 pages.

Cruz et al., "Neighbor-Aided Localization in Vehicular Networks", IEEE Transactions on Intelligent Transportation Systems, vol. 18, No. 10, Oct. 2017, pp. 2693-2702.

"Multipath Propagation", Wikipedia, Retrieved on Dec. 17, 2020, Webpage available at: https://en.wikipedia.org/wiki/Multipath_propagation.

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP TS 36.305, V15.2.0, Dec. 2018, pp. 1-88.

Alkhateeb et al., "Deep Learning Coordinated Beamforming for Highly-Mobile Millimeter Wave Systems", arXiv, Feb. 22, 2019, pp. 1-42.

Invitation to Pay Fees and Partial Search Report received for corresponding Patent Cooperation Treaty Application No. PCT/EP2018/066939, dated Apr. 4, 2019, 10 pages.

International Search Report and Written Opinion received for corresponding Patent Cooperation Treaty Application No. PCT/EP2018/066939, dated May 21, 2019, 17 pages.

Invitation to Pay Fees and Partial Search Report received for corresponding Patent Cooperation Treaty Application No. PCT/EP2019/057901, dated Jul. 15, 2019, 10 pages.

International Search Report and Written Opinion received for corresponding Patent Cooperation Treaty Application No. PCT/EP2019/057901, dated Sep. 9, 2019, 17 pages.

\* cited by examiner

POSITION DETERMINATION

RELATED APPLICATION

This application claims priority to PCT Application No. PCT/EP2018/066939, filed on Jun. 25, 2018 which is incorporated herein by reference in its entirety.

FIELD

Embodiments relate to position determination, for example determining the position of radio user equipment.

BACKGROUND

In a radio communications system, it may be useful to determine the position of user equipment (UE). Position in this context refers to geographic position. For example, the position of the user equipment may be useful for optimization of radio resource management, for provision of position-based services and/or emergency positioning for indicating to emergency services an accurate location of the user equipment.

Some user equipment have on-board positioning receivers, e.g. Global Positioning System (GPS) or Global Navigation Satellite System (GNSS) receivers which can determine position with reference to satellites. However, there is not always sufficient satellite visibility to obtain a position. Other methods based on multilateration involve a relatively complex communication process involving the mobile network determining a user equipment's position.

SUMMARY

According to one aspect, there is provided an apparatus, comprising: means for receiving from each of at least three remote base stations transmitted data comprising a portion indicating the geographic position of the respective base station and a transmission time of a reference signal or data; and means for determining the geographic position of the apparatus based on the received geographic positions and the delay between the transmission time and a reception time of the transmitted reference signal or data.

The geographic position of each respective base station may refer to the position of one or more antennas on or associated with the base station. The receiving means may be configured to receive the geographic position of each base station in a radio frame or sub-frame or commonly agreed reference symbol of repetitive nature. The radio frame or sub-frame may be one of a LTE, 5G or subsequent-generation radio frame.

The transmission time may indicate the physical transmission time of said reference signal or data from the base station. The physical transmission time may be determined based on an absolute reference time at the base station modified by a delay time to account for processing at the base station. The reception time of the transmitted data may indicate the physical reception time at the apparatus. The physical reception time may be determined based on an absolute reference time at the user equipment modified by a delay time to account for processing at the apparatus.

The receiving means may be configured to receive the transmitted data in a System Information Block (SIB).

The receiving means may be configured to receive the transmitted data from a broadcast signal issued by the respective base stations. The receiving means may be configured to receive the transmitted data indirectly from the respective base stations. The receiving means may be configured to receive the transmitted data from a mobile network database.

The geographic position determining means may be configured to determine said position without the need of an active data connection to the base stations. The geographic position determining means may be configured to determine said position in a Radio Resource Control (RRC) Idle state. The geographic position determining means may be configured to determine said position by calculating the distances between the apparatus and the base stations using the respective time delays and the intersection of said calculated distances from the respective positions of the base stations. The geographic position determining means may be configured to determine the distances D from first, second and third base stations k, m, n in two-dimensions using:

$$Dk = c \cdot (T_1 k - T_0 k);$$

$$Dm = c \cdot (T_1 m - T_0 m); \&$$

$$Dn = c \cdot (T_1 n - T_0 n)$$

where c is the speed of light, $T_0 k$, $T_0 m$, $T_0 n$ are respectively the time of physical transmission of the data from the respective base stations and $T_1 k$, $T_1 m$, $T_1 n$ are respectively the time of physical reception of the data from the respective base stations by the apparatus.

The geographic position determining means may be configured to determine the distances D from first, second and third base stations k, m, n in three-dimensions using:

$$D_{UE\ eNodeB\ k}(X,Y,H) = \sqrt{((X_{eNodeB\ k} - X_{UE})^2 + (Y_{eNodeB\ k} - Y_{UE})^2 + (H_{eNodeB\ k} - H_{UE})^2)};$$

$$D_{UE\ eNodeB\ m}(X,Y,H) = \sqrt{((X_{eNodeB\ m} - X_{UE})^2 + (Y_{eNodeB\ m} - Y_{UE})^2 + (H_{eNodeB\ m} - H_{UE})^2)};$$

$$D_{UE\ eNodeB\ n}(X,Y,H) = \sqrt{((X_{eNodeB\ n} - X_{UE})^2 + (Y_{eNodeB\ n} - Y_{UE})^2 + (H_{eNodeB\ n} - H_{UE})^2)};$$

where $D_{UE\ eNodeB}$ (X, Y, H) is the distance D between the apparatus and the given base station k, m, n, $X_{eNodeB}$, $Y_{eNodeB}$, $H_{eNodeB}$ are the base station coordinates and $X_{UE}$, $Y_{UE}$, $H_{UE}$ are the apparatus coordinates.

The apparatus may further comprising means to select a cell or base station based on the determined position and means for initiating an access request with said cell or base station.

The selecting means may be configured to select the closest cell or base station.

The apparatus may be a mobile telephone, smartphone or tablet computer.

Another aspect provides an apparatus, comprising: means for transmitting to one or more user equipment data comprising a portion indicating its geographic position and a transmission time of a reference signal or data for local position determination by the one or more user equipment.

The geographic position may refer to the position of one or more antennas on or associated with the apparatus. The data may be transmitted in a radio frame or sub-frame or commonly agreed reference symbol of repetitive nature. The radio frame or sub-frame may be one of a LTE, 5G or subsequent-generation radio frame.

The transmission means may be configured such that the transmission time indicates the physical transmission time of said reference signal or data from the apparatus. The transmission means may be configured such that the physical transmission time is determined based on an absolute reference time at the apparatus modified by a delay time to account for processing at the apparatus. The transmission means may be configured to transmit the transmitted data in a System Information Block (SIB). The transmission means may be configured to broadcast the transmitted data. The transmission means may be configured to transmit the data to a mobile network database for subsequent access by one or more user equipment.

The apparatus may be a base station.

Another aspect provides a method, comprising: receiving at an apparatus from each of at least three remote base stations transmitted data comprising a portion indicating the geographic position of the respective base station and a transmission time of a reference signal or data; and determining the geographic position of the apparatus based on the received geographic positions and the delay between the transmission time and a reception time of the reference signal or data.

The geographic position of each respective base station may refer to the position of one or more antennas on or associated with the base station. The geographic position of each base station may be received in a radio frame or sub-frame or commonly agreed reference symbol of repetitive nature.

The radio frame or sub-frame may be one of a LTE, 5G or subsequent-generation radio frame.

The transmission time may indicate the physical transmission time of said portion from the base station. The physical transmission time may be determined based on an absolute reference time at the base station modified by a delay time to account for processing at the base station. The reception time of the transmitted data may indicate the physical reception time at the apparatus. The physical reception time may be determined based on an absolute reference time at the user equipment modified by a delay time to account for processing at the apparatus.

The transmitted data may be received in a System Information Block (SIB).

The transmitted data may be received from a broadcast signal issued by the respective base stations.

The transmitted data may be received indirectly from the respective base stations.

The receiving means may be configured to receive the transmitted data from a mobile network database.

The position may be determined without the need of an active data connection to the base stations.

The position may be determined in a Radio Resource Control (RRC) Idle state.

The position may be determined by calculating the distances between the apparatus and the base stations using the respective time delays and the intersection of said calculated distances from the respective positions of the base stations.

The distances D from first, second and third base stations k, m, n may be determined in two-dimensions using:

$$Dk = c \cdot (T_1k - T_0k);$$

$$Dm = c \cdot (T_1m - T_0m); \&$$

$$Dn = c \cdot (T_1n - T_0n)$$

where c is the speed of light, $T_0k$, $T_0m$, $T_0n$ are respectively the time of physical transmission of the data from the respective base stations and $T_1k$, $T_1m$, $T_1n$ are respectively the time of physical reception of the data from the respective base stations by the apparatus.

The distances D from first, second and third base stations k, m, n may be determined in three-dimensions using:

$$D_{UE\ eNodeB\ k}(X,Y,H) = \sqrt{((X_{eNodeB\ k} - X_{UE})^2 + (Y_{eNodeB\ k} - Y_{UE})^2 + (H_{eNodeB\ k} - H_{UE})^2)};$$

$$D_{UE\ eNodeB\ m}(X,Y,H) = \sqrt{((X_{eNodeB\ m} - X_{UE})^2 + (Y_{eNodeB\ m} - Y_{UE})^2 + (H_{eNodeB\ m} - H_{UE})^2)};$$

$$D_{UE\ eNodeB\ n}(X,Y,H) = \sqrt{((X_{eNodeB\ n} - X_{UE})^2 + (Y_{eNodeB\ n} - Y_{UE})^2 + (H_{eNodeB\ n} - H_{UE})^2)};$$

where $D_{UE\ eNodeB}(X, Y, H)$ is the distance D between the apparatus and the given base station k, m, n, $X_{eNodeB}$, $Y_{eNodeB}$, $H_{eNodeB}$ are the base station coordinates and $X_{UE}$, $Y_{UE}$, $H_{UE}$ are the apparatus coordinates.

The method may further comprise selecting a cell or base station based on the determined position and initiating an access request with said cell or base station.

The closest cell or base station may be selected.

The method of any preceding definition may be performed at a mobile telephone, smartphone or tablet computer.

Another aspect provides a method, comprising: transmitting to one or more user equipment data comprising a portion indicating its geographic position and a transmission time of a reference signal or data for local position determination by the one or more user equipment.

The geographic position may refer to the position of one or more antennas on or associated with the apparatus.

The data may be transmitted in a radio frame or sub-frame or commonly agreed reference symbol of repetitive nature.

The radio frame or sub-frame may be one of a LTE, 5G or subsequent-generation radio frame.

The transmission time may indicates the physical transmission time of the reference signal from the apparatus.

The physical transmission time may be determined based on an absolute reference time at the apparatus modified by a delay time to account for processing at the apparatus.

Transmitting may comprise transmitting the data in a System Information Block (SIB).

Transmitting may comprise broadcasting the transmitted data.

Transmitting may comprise transmitting the data to a mobile network database for subsequent access by one or more user equipment.

The method of any preceding definition may be performed at a radio base station.

Another aspect provides an apparatus comprising at least one processor, at least one memory directly connected to the at least one processor, the at least one memory including computer program code, and the at least one processor, with the at least one memory and the computer program code being arranged to perform the method of any of preceding definition.

Another aspect provides a computer program product comprising a set of instructions which, when executed on an apparatus, is configured to cause the apparatus to carry out the method of any preceding definition.

Another aspect provides a non-transitory computer readable medium comprising program instructions stored thereon for performing a method, comprising: receiving at an apparatus from each of at least three remote base stations transmitted data comprising a portion indicating the geographic position of the respective base station and a transmission time of a reference signal or data; and determining the geographic position of the apparatus based on the received geographic positions and the delay between the transmission time and a reception time of the reference signal or data.

Another aspect provides an apparatus comprising: at least one processor; and at least one memory including computer program code which, when executed by the at least one processor, causes the apparatus: to receive at an apparatus from each of at least three remote base stations transmitted data comprising a portion indicating the geographic position of the respective base station and a transmission time of a reference signal or data; and to determine the geographic position of the apparatus based on the received geographic positions and the delay between the transmission time and a reception time of the reference signal or data.

Another aspect provides a non-transitory computer readable medium comprising program instructions stored thereon for performing a method, comprising: transmitting to one or more user equipment data comprising a portion indicating its geographic position and a transmission time of a reference signal or data for local position determination by the one or more user equipment.

Another aspect provides an apparatus comprising: at least one processor; and at least one memory including computer program code which, when executed by the at least one processor, causes the apparatus: to transmit to one or more user equipment data comprising a portion indicating its geographic position and a transmission time of a reference signal or data for local position determination by the one or more user equipment.

Another aspect provides an apparatus, comprising: means for receiving a request from a remote terminal for transmitting a position of the apparatus, the position being determined using the method of any of preceding definition; and means for allowing or denying the request.

Another aspect provides a method, comprising: receiving at an apparatus a request from a remote terminal for transmitting a position of the apparatus, the position being determined using the method of any of preceding definition; and denying or allowing the request.

In the above, any reference to "means" may refer to hardware, software or a combination thereof.

For the avoidance of doubt also, references to transmission time of a reference signal or reference data may refer to the transmission time of any agreed signal or data which is repetitive in nature. This may or may not be the transmission time of the portion comprising the positional data.

BRIEF DESCRIPTION OF DRAWINGS

Example embodiments will now be described by way of non-limiting example, with reference to the accompanying drawings, in which.

DETAILED DESCRIPTION

Embodiments herein relate to position determination in the context of radio user equipment (UE), such as, but not limited to, mobile telephones or smartphones, but can also be applied to other mobile radio equipment. Position in this context means geographic position.

References herein to GPS are given by way of example only, any offset to any other GNSS navigation constellation is applicable.

The following abbreviations may be referred to below:
CSI—Channel State Information;
CQI—Channel Quality Indicator;
GPS—Global Positioning System;
GNSS—Global Navigation Satellite System;
GUI—Graphical User Interface;
MIB—Master Information Block;
MTOA—Measured Time Of Arrival;
OTDOA—Observed Time Difference Of Arrival;
PSS—Primary Synchronization Signal;
RACH—Random Access Channel;
RRC—Radio Resource Control;
SIB—System Information Block;
SSS—Secondary Synchronization Signal;
TOA—Time Of Arrival;
UE—User Equipment;

UE position determination offers useful applications, such as optimization of radio resource management, area based services whereby, for example, applications on the UE may return results based on the position of the UE, or for 112/911/999 emergency positioning. The result of position determination is typically a set of coordinates, which may or may not include elevation or height (H), and which may be applied to a graphical user interface (GUI) such as a map or tracking application.

UE positioning may be provided by the UE itself through the use of an on-board GPS or GNSS receiver or may be calculated by the network using OTDOA. The former requires sufficient coverage and visibility of satellites, whereas the latter requires complex signaling with the radio communications network which is responsible for determining the position and sending it back to the UE. Also, data from at least four base stations or enhanced NodeBs (eNBs) is needed.

Embodiments herein provide apparatuses and methods, which may be implemented in hardware, software, or a combination thereof, whereby the UE may determine its own position, i.e. locally, based on data indicative of the geographic position of three or more base stations (e.g. eNBs in the context of LTE or 5G) and a transmission time of a reference signal or reference data, which could be the time of transmitting the position data or the time of transmitting any other reference signal or reference data, which can be any agreed signal or data which has repetitive nature. It may for example be the time of the start of a particular frame or a sub-frame or any agreed symbol. For ease of reference, we will refer to reference signal and/or reference data. The transmission time may be considered the actual physical transmission time. This enables the UE to calculate the delay between the transmission time and the reception time of the data for each base station and hence the distance from each base station position. It follows that by plotting in two or three dimensions the intersection points of the three distances, an accurate position determination can be made by the UE without the need to send data to the radio network.

We may refer to this process herein as Measured Time of Arrival (MTOA), for example to distinguish the process from OTDOA.

Embodiments herein assume the use of a LTE/5G UE and associated base station systems and networks. It will however be appreciated that the embodiments are applicable generally to other forms of radio UEs and base station infrastructures, including future generation cellular radio systems.

Embodiments may use base station antenna position coordinates (X, Y, H), where H refers to height, and the exact time $T_0$ when the given LTE/5G radio frame providing in this case the agreed reference data or signal was physically sent by the antenna system of the base station. H may relate to both terrain and mast height. This method is therefore based on Time Of Arrival (ToA) principles. The antenna position coordinates (X, Y, H) generally refer to the position of the antenna itself on the mast or similar location of the base station, but we will refer to base station for ease of explanation.

In some embodiments, such data may be broadcasted by base stations as part of cell System Information Blocks (part of SIB 15) or delivered in any other way to the UE. In some embodiments, no active connection (RRC_CONNECTED) is required by the UE to the base stations to calculate the UE position based on base station signaling messages. That is, the UE may be in the SIB_IDLE state. Indeed, embodiments may not require any reference signaling (such as RSTD in the case of OTDOA) as frame or sub-frame signaling may be used for UE positioning embodiments herein.

Figure 1:
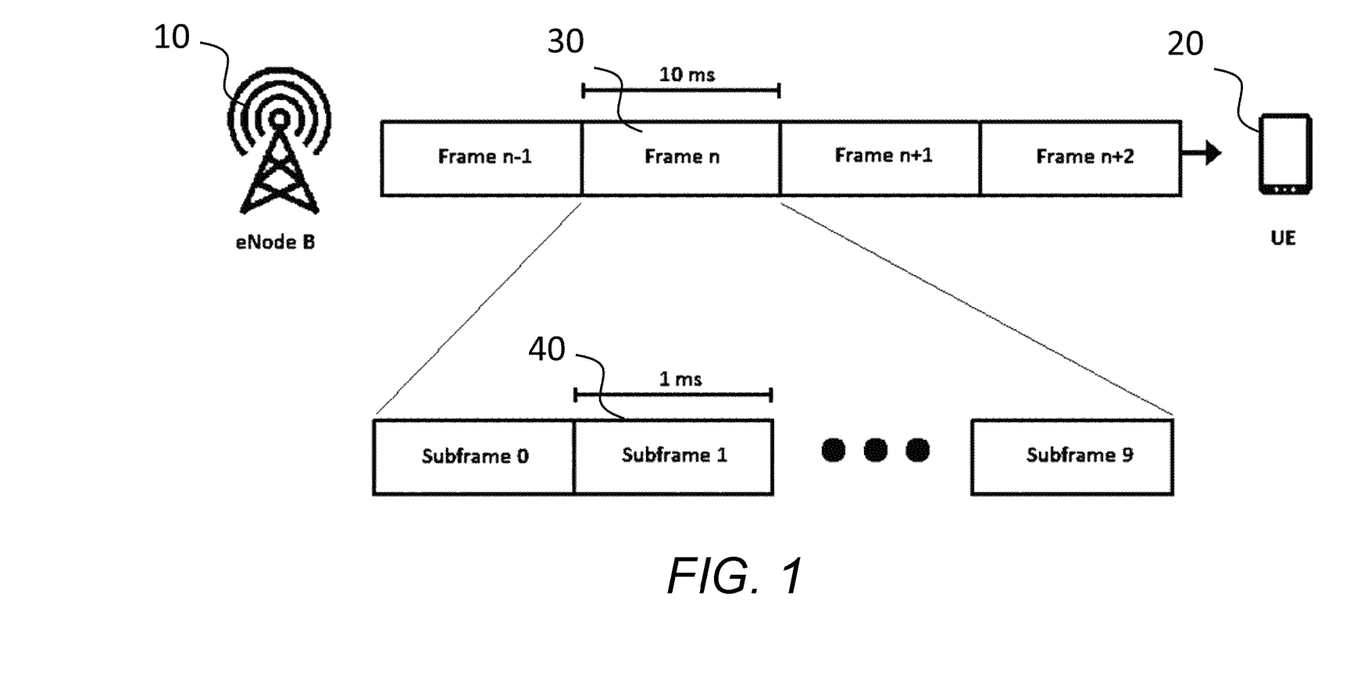
FIG. 1 is a schematic diagram of a typical LTE frame structure transmitted between a base station and a user equipment.

FIG. 1 is a schematic diagram of a typical LTE frame structure transmitted between a base station (eNB) 10 and a UE 20.

Example embodiments assume the following:
the speed of light (c), including 3G/LTE/5G microwaves, in a vacuum is 299792458 m/s, approximately 299700000 m/s in air, and may be rounded to 300000 km/s;
in 1 μs a distance of 300 metres is traveled by a RF microwave signal;
time synchronisation sources like GPS may give an absolute time value with an accuracy of 97 ns (1 sigma), rounded to 0.1 ms, approximately 30 metres in distance;
an LTE frame 30 is 10 ms long, and an LTE sub-frame 40 is 1 ms long, as illustrated in FIG. 1; and
the distance traveled by an RF signal in 10 ms is equal approximately to 3000000 metres.

The purpose of giving these assumptions is to resolve potential ambiguity in describing example embodiments with respect to a typical cell maximum range. If alternative figures are assumed, then appropriate modifications will apply.

Figure 2:
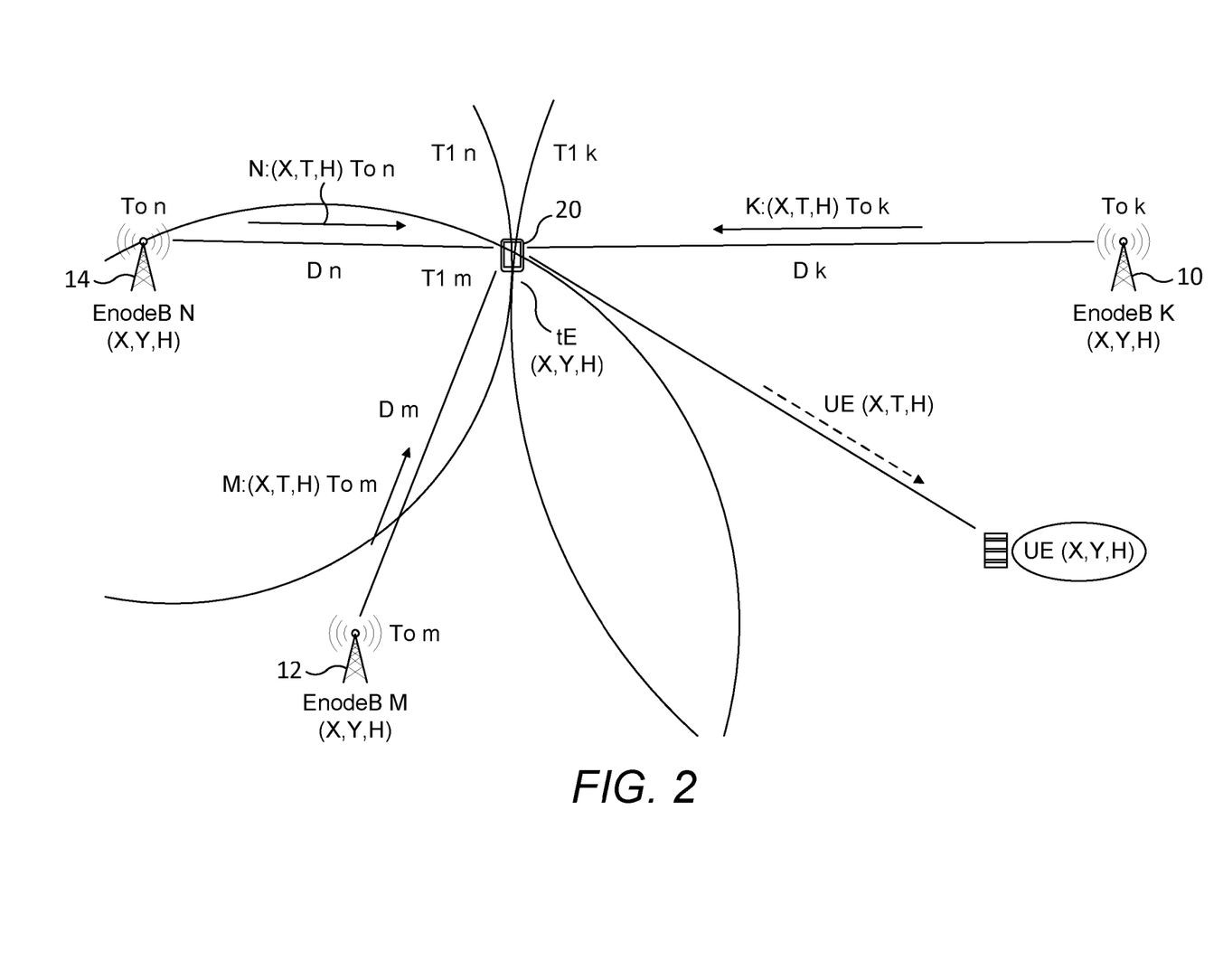
FIG. 2 is a schematic diagram of a user equipment according to example embodiments in relation to three geographically separate base stations.

FIG. 2 is a schematic diagram of the UE 20 in relation to three geographically separate base stations 10, 12, 14 to illustrate example embodiments. The base stations 10, 12, 14 are referred to in FIG. 2 as eNodeB K, eNodeB M and eNodeB N respectively. Other embodiments may use more than three base stations using substantially the same procedure.

Example embodiments involve the UE 20 determining its position using TOA principles. The distances (Dk, Dm, Dn) of the UE 20 from the base stations 10, 12, 14 may be calculated using:

$$Dk = c \cdot (T_1 k - T_0 k);$$

$$Dm = c \cdot (T_1 m - T_0 m); \&$$

$$Dn = c \cdot (T_1 n - T_0 n)$$

where c is the speed of light, $T_0 k$ $T_0 m$ $T_0 n$ are respectively the time of physical transmission of the data from the respective base stations and $T1k$, $T_1 m$, $T_1 n$ are respectively the time of physical reception of the data from the respective base stations by the apparatus.

The determined distances Dk, Dm, Dn correspond to potential positions of the UE 20 on circles, in a two-dimensional perspective as shown in FIG. 2, and the intersection of the circles gives the position of the UE (X, Y, H).

The position of the UE 20 can also be determined in a three-dimensional perspective, which may be calculated using:

$$D_{uE\ eNodeB\ k}(X,Y,H) = \sqrt{((X_{eNodeB\ k} - X_{UE})^2 + (Y_{eNodeB\ k} - Y_{UE})^2 + (H_{eNodeB\ k} - H_{UE})^2)};$$

$$D_{UE\ eNodeB\ m}(X,Y,H) = \sqrt{((X_{eNodeB\ m} - X_{UE})^2 + (Y_{eNodeB\ m} - Y_{UE})^2 + (H_{eNodeB\ m} - H_{UE})^2)};$$

$$D_{UE\ eNodeB\ n}(X,Y,H) = \sqrt{((X_{eNodeB\ n} - X_{UE})^2 + (Y_{eNodeB\ n} - Y_{UE})^2 + (H_{eNodeB\ n} - H_{UE})^2)};$$

where $D_{UE\ eNodeB}$ (X, Y, H) is the distance D between the apparatus and the given base station k, m, n, $X_{eNodeB}$, $Y_{eNodeB}$, $H_{eNodeB}$ are the base station coordinates and $X_{UE}$, $Y_{UE}$, $H_{UE}$ are the apparatus coordinates.

In the three-dimensional case, the intersection of spheres gives the position of the UE 20 (X, Y, H).

Figure 3:
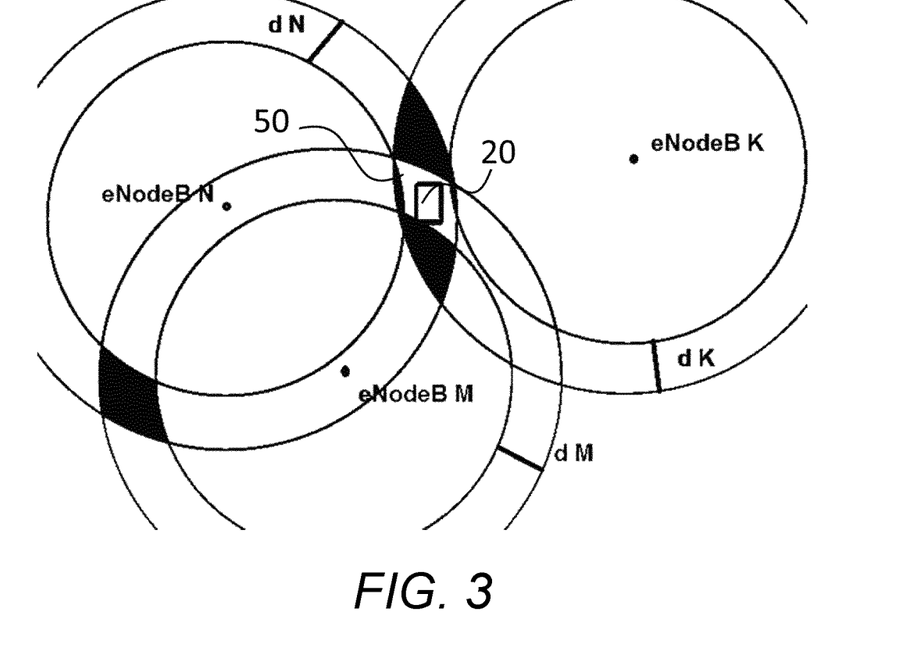
FIG. 3 is a schematic diagram similar to FIG. 2 indicating the effect of inaccuracies.

Referring to FIG. 3, it will be appreciated that any inaccuracy in the time or distance measurements, including any synchronisation issues, may dilute the precision of the position determination of the UE 20. As will be observed, the circles (or spheres) produced by the above expressions will have a range of potential values and hence the overlap or intersection will produce an area 50 within which the UE 20 is located, and hence the determination is less accurate.

In determining its position (X, Y, H), the UE 20 may operate in an RRC_IDLE mode. The UE 20 may also operate in an RRC_CONNECTED mode, as the mode has no impact on the method employed in the example embodiments herein. However, if the position of the UE 20 is to be reported to the mobile network via one of the base stations 10, 12, 14 (which may be useful in some situations) then the UE will need to switch to the RRC_CONNECTED mode, if not already in said mode.

The UE 20 by its nature is a mobile device and hence may move position over time. The UE 20 may therefore continuously, or at a periodic update rate, monitor and measure the relevant signals from the base stations 10, 12, 14 within range to determine its ongoing position, if needed.

There are a number of possible methods by which each base station 10, 12, 14 may deliver their respective position (X, Y, H) and exact time of LTE/5G frame transmission to the UE 20.

For example, each base station 10, 12, 14 may transmit its position data (X, Y, H) in a broadcast transmission or as part of a SIB. For example, each base station 10, 12, 14 may transmit the position data (X, Y, H) to a database, e.g. a mobile network database, which can be accessed by the UE 20. This data may be accessible directly or by linking with Cell ID data.

Figure 4:
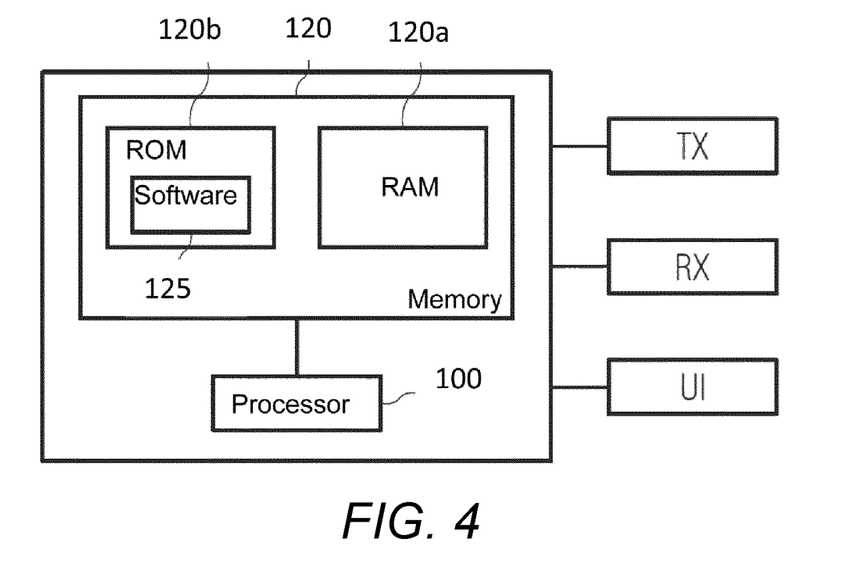
FIG. 4 is a block diagram showing components of the FIG. 2 user equipment.

FIG. 4 shows an apparatus according to an embodiment, which may be the UE 20. The UE 20 comprises at least one processor 100 and at least one memory 120 directly or closely connected or coupled to the processor 100. The memory 120 may comprise at least one random access memory (RAM) 120*a* and at least one read-only memory (ROM) 120*b*. Computer program code (software) 125 may be stored in the ROM 120*b*. The UE 20 may be connected to a transmitter path and a receiver path of the base stations 10, 12, 14 (and/or other base stations) in order to obtain respective signals comprising the aforementioned data. The UE 20 may be connected with a user interface (UI) for instructing the apparatus and/or for outputting video data. The at least one processor 100 with the at least one memory 120 and the computer program code may be arranged to cause the apparatus to at least perform methods described herein, for example including methods to be described with reference to FIGS. 5 and 6.

The processor 100 may be a microprocessor, plural microprocessors, a control, or plural microcontrollers.

The memory 120 may take any suitable form.

The transmitter path and receiver path may be established using a transceiver module which may be arranged suitable for any form of radio communications, for example cellular radio communications according to LTE/5G or future-generation standards.

Figure 5:
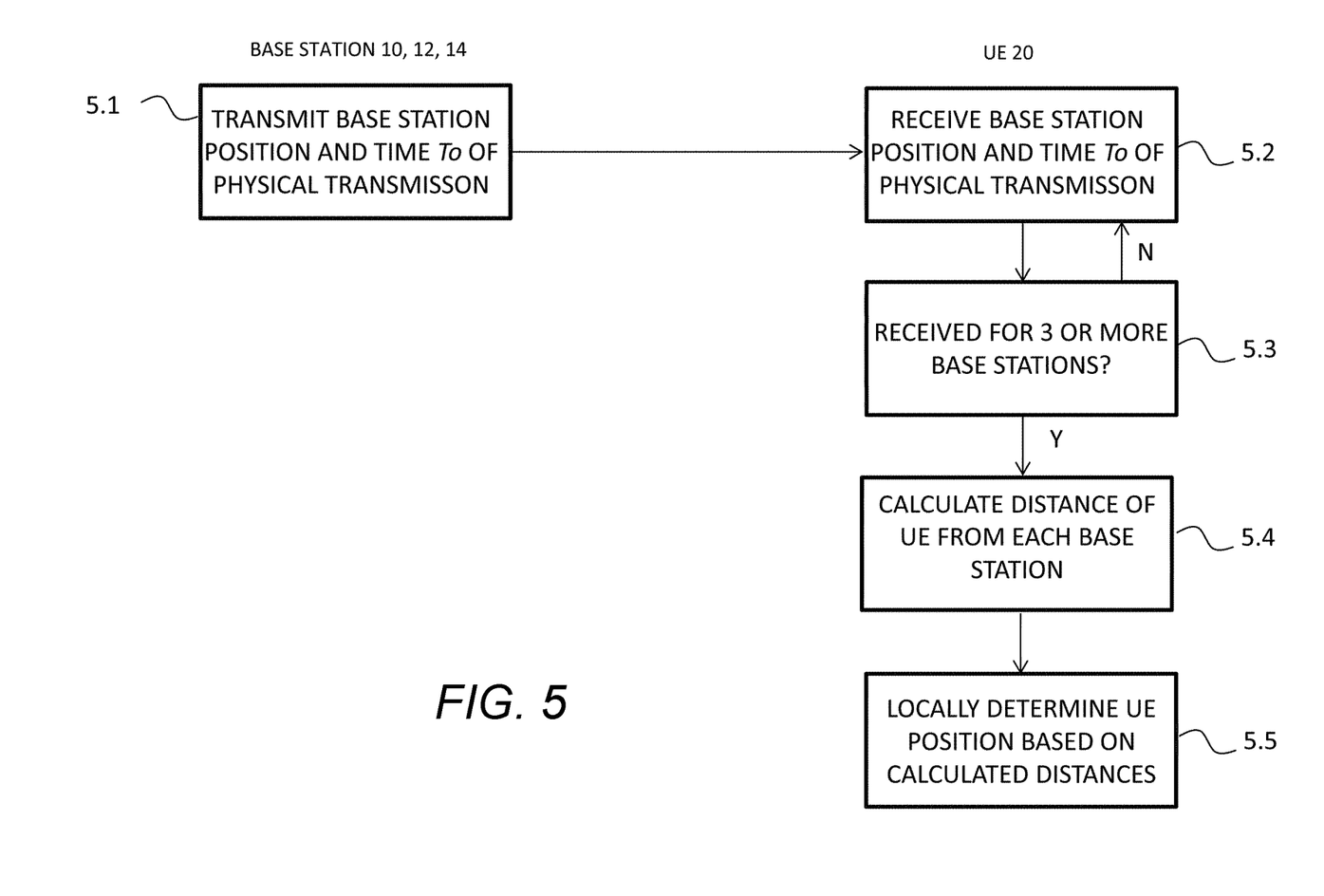
FIG. 5 is a flow diagram showing operations that may form part of a method according to example embodiments.

FIG. 5 is a flow diagram showing operations that form part of a method according to example embodiments. Operations performed both at a base station 10, 12, 14 and at the UE 20 are shown in FIG. 5.

A first operation 5.1 may comprise the base station 10, 12, 14 transmitting its position (X, Y, H) and exact time $T_o$ of data transmission to the UE 20. This transmission may be direct to the UE 20 or may be indirect, e.g. by way of a database. The first operation 5.1 may be performed using hardware, software or a combination thereof, and may use an apparatus similar in form to FIG. 4 as appropriate.

A first operation 5.2 performed at the UE 20 may comprise receiving the base station position (X, Y, H) data in the transmitted signal and the exact time $T_o$ of transmission data. Another operation 5.3 may comprise determining if said data has been received for three or more in-range base stations 10, 12, 14. If not, the method may return to operation 5.2. If so, the method may move to operation 5.4 whereby the distance (Dk, Dm, Dn) of the UE 20 from each of the in-range base stations 10, 12, 14 is calculated. A further operation 5.5 may comprise using the calculated distances (Dk, Dm, Dn) to locally determine the UE 20 position, i.e. using the equations mentioned previously.

It will be appreciated that some operations may be omitted and/or re-ordered. The numbering of operations is not necessarily indicative of processing order.

Figure 6:
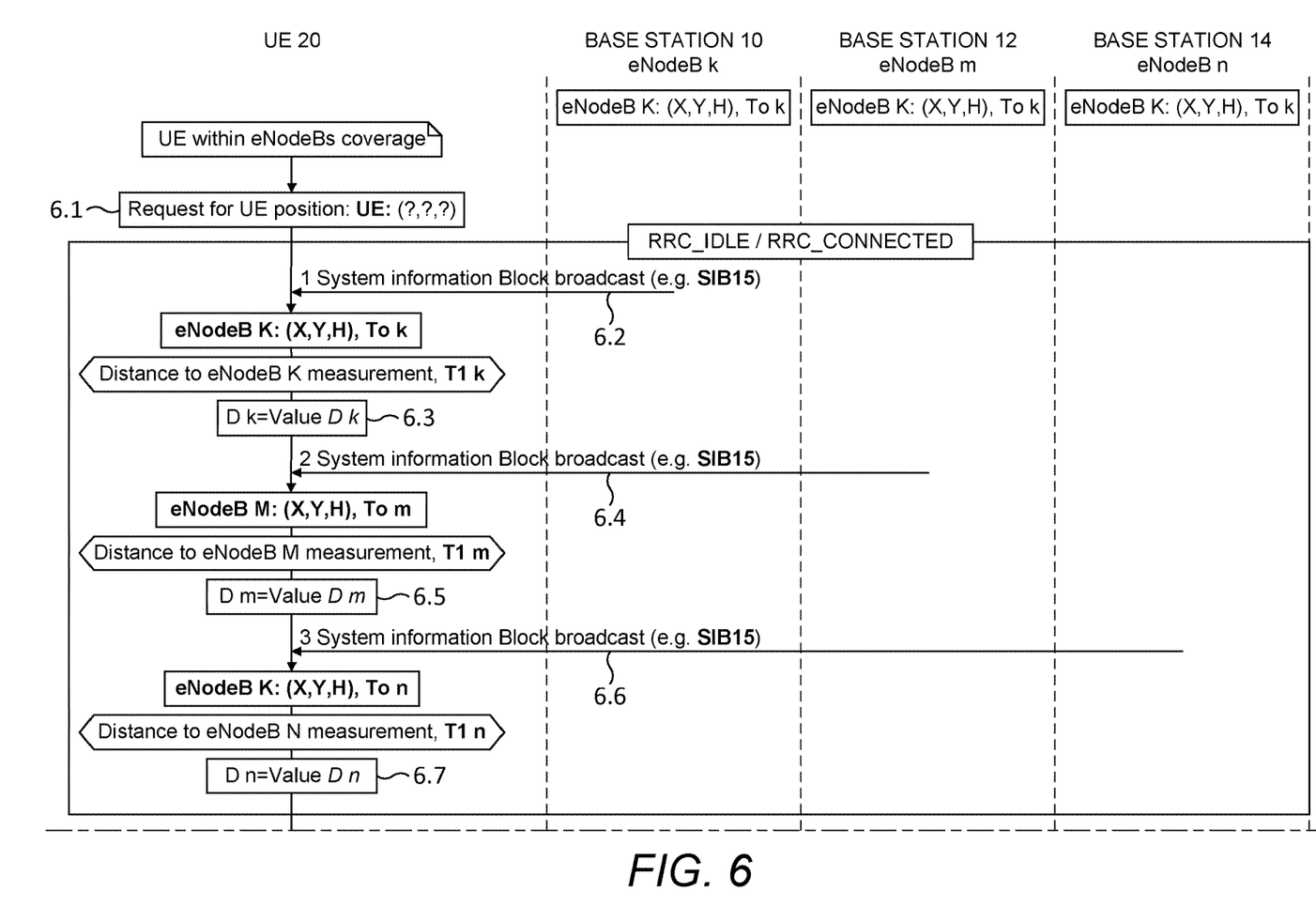
FIG. 6 is a flow diagram showing operations that may form part of another method according to example embodiments.

FIG. 6 is a flow diagram showing operations that form part of a method according to other example embodiments. Operations performed at respective base stations 10, 12, 14 and at the UE 20 are shown in FIG. 6. In this example, we assume that the base station (eNodeB) position data (X, Y, H) is transmitted to the UE 20 as part of SIB data, for example during the first entry to the given cell coverage, or continuously with a specified update rate. According to 3GPP TS 25.331 V15.1.0 (2017-12) 3rd Generation Partnership Project; Technical Specification Group Radio Access Network; Radio Resource Control (RRC); Protocol specification (Release 15), SIB 15 may consist of UE positioning-related data (GPS, OTDOA); however there is no data related to embodiments disclosed herein, such as eNodeB antenna position or T0 time, or similar.

A first operation 6.1 may comprise the UE 20 receiving a request for its own position, e.g. from an application on the UE. The following operations may occur in either an RRC_IDLE or RRC_CONNECTED mode.

In another operation 6.2, the first base station 10 may transmit (and hence the UE 20 may receive) a SIB broadcast, e.g. SIB 15 comprising its position data and its $T_o$, the exact physical transmission time. In another operation 6.3, the UE 20 may determine its distance to the first base station 10. In another operation 6.4, the second base station 12 may transmit a SIB broadcast comprising its position data and its $T_o$. In another operation 6.5, the UE 20 may determine its distance to the second base station 12. In another operation 6.6, the third base station 14 may transmit a SIB broadcast comprising its position data and its $T_o$. In another operation 6.7, the UE 20 may determine its distance to the third base station 14. It will be appreciated that the transmit operations 6.2, 6.4, 6.6 may be performed in any sequence or at the same time, as may the determination operations 6.3, 6.5, 6.7.

Another operation 6.8 may comprise the UE 20 determining its position (X, Y, H) based on the three distances determined in operations 6.3, 6.5, 6.7.

Subsequent operations shown on FIG. 6 include reference to a possible application whereby the UE 20 may select a cell based on position, e.g. by choosing the first base station 10 because it is closest. This is followed by subsequent PRACH and access grants with RRC connections being continued accordingly.

In certain embodiments, only one frame or sub-frame may be present in the typical cell coverage within a 1 millisecond period (a sub-frame). Time of Arrival (ToA) method require provision of a physical signal transmission time at the base station with known position. As will be appreciated, we refer to this herein as $T_o$.

In LTE/5G, the use of GPS, GNSS or another time reference source for frame synchronisation may be used. However, this time reference is measured at a reference point and may not reflect the time of physical frame transmission over the radio interface. As the typical base station downlink delay time is 1 ms, inaccuracy in the UE position measurement using such methods may not be sufficiently accurate. Accordingly, correction is proposed in example embodiments.

Figure 7:
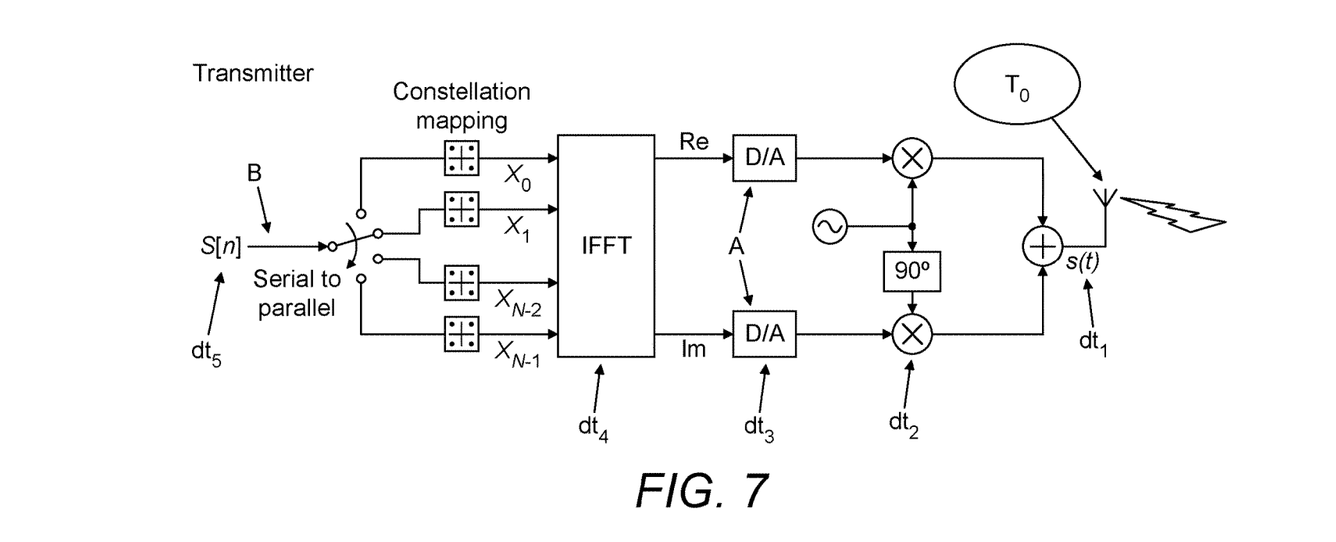
FIG. 7 is an example circuit diagram of time reference source locations in one or more base stations according to example embodiments.

Due to $T_o$ being related to the physical transmission of, in some examples, the given LTE/5G frame, this time cannot be sent in the same frame, because some processing relating to $T_0$ may be needed. However, due to high frame to frame stability, it may be assumed that $T_0$ delivered together with the next frame or next message still may be of good quality, and adequate for UE positioning purposes disclosed herein. Frame to frame synchronization may be verified by PSS and SSS LTE signals. In order to justify this assumption, $T_o$ is measured with respect to the LTE basic time unit, i.e. Ts. In example embodiments, Ts is used as a trigger for an absolute time value which may be obtained at a given time reference point, tA or tB, which may be point A or point B as shown in FIG. 7 which is an example of a time reference source location in the base stations 10, 12, 14. The better position is at the antenna output itself, but access to this point may be limited, there may be additional delay due to cable length, and additional signaling may be needed. The proposed time points shown in FIG. 7 are more readily accessible. To calculate $T_o$, it is also necessary to take into account any delays in the processing chain, mainly related to the analogue elements and cable length. This overall delay may be measured during field tests where a reference UE (at a known position and distance from the base station) may measure signal propagation delay with respect to the tA or tB absolute time reference value. Any additional delay with respect to a measured propagation delay reflects a summary of delays related to the remaining signal processing. For example, and with reference to FIG. 7, $T_o$ may be determined by:

$$T_0 = tA + dt1 + dt2 + dt3$$

$$T_0 = tB + dt1 + dt2 + dt3 + dt4 + dt5$$

where tA and tB are the absolute time values at reference points A and B respectively, and dt1, dt2, dt3, dt4 and dt5 are delays associated with the respective stages of signal processing.

Figure 8:
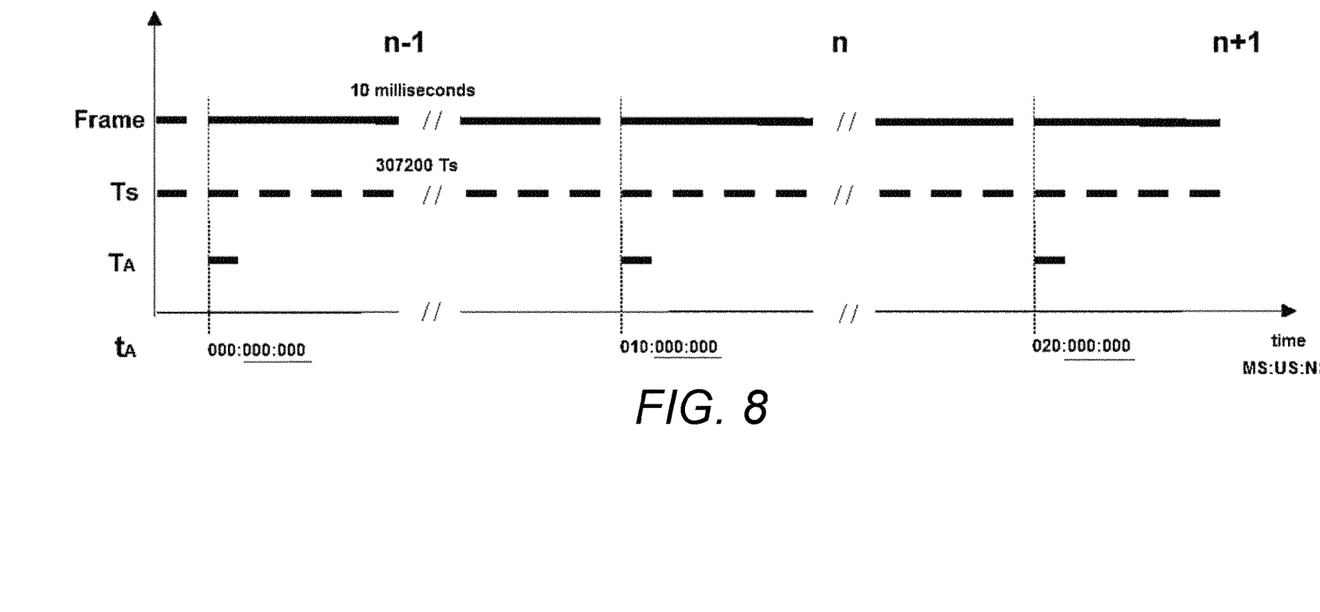
FIG. 8 is a timing diagram useful for understanding the description of FIG. 7.

It should be appreciated that the absolute time tA and tB are obtained with the help of Ts, acting as a trigger, as shown graphically in FIG. 8. As will be seen, when a new frame or sub-frame is commenced by the presence of a specified number of Ts periods, it may trigger an absolute time counter at point TA, which latches the absolute time value down to the nanoseconds level (ms:μs:ns). The base unit time Ts is used internally for data processing purposes both by the base station 10, 12, 14 and the UE 20.

The value of Ts may be ported on absolute time with respect to point A or point B, as shown in FIG. 7 with corresponding tA or tB values. This may lead to inaccuracies related to absolute time source quality with respect to stability and/or accuracy. For example, if GPS is used for the base station synchronisation, time accuracy is 97 ns. Ts is approximately 32 ns long, and so approximately three Ts periods may pass. This is not a problem in the case of time stamping at the base station level, but at the UE 20, even if the UE uses the same GPS synchronisation method, 97 ns may cause a position error of approximately 30 metres, assuming 0.1 μs accuracy.

It should be understood that both Ts, as time reference unit, and the radio frame as a reference signal, are only examples of possible signaling which may be used in example embodiments. Other signals (e.g. frame trigger, MIB fields in LTE broadcast signaling etc.) may also act as a trigger, and other symbols may be used as a reference for positioning.

The value of $T_o$ may provide values of only ms, μs and ns, as frames are sent continuously every 10 ms for LTE, and sub-frames at each ms for LTE. The UE 20 may resolve ambiguity at this level. LTE frame to frame synchronisation is guaranteed by the size of the Ts period (PSS, SSS) and so it may be assumed that μs and ns (μs:ns) of the $T_o$ value may be stable, and only the ms part may be changed to indicate the presence of the next sub-frame, 1 ms later, or the next frame, 10 ms later. In normal continuous base station operation, a change of more than Ts (jitter) should not be observed. At the time T1, the propagation delay needs to be added.

Accordingly, it may be assumed that the $T_o$ value, and associated μs:ns corrections provided in the subsequent frame (n+1) or later may be used to determine the distance of frame nor even frame n−1, and still the overall measurement may be within the limits determined by the time synchronisation source, e.g. GPS.

The $T_o$ value may be provided to the UE 20 using a number of different methods, because its value is relatively stable. For example, the UE 20 may receive the $T_o$ value in the same way as it receives the base station position data. However, $T_o$ needs to be broadcast.

The exact broadcast period for the position data (X, Y, H) and the associated $T_o$ values of a base station 10, 12, 14 may be configured with respect to the network operator's requirements and the offered quality of service for UE positioning.

In some embodiments, the UE 20 may listen to broadcast transmissions from the surround base stations 10, 12, 14 in the same way as during RACH procedure; from these transmissions, the UE 20 may obtain the base station positions (X, Y, H) and associated $T_o$ values, any messages indicated in FIG. 6, which may be sent as part of a SIB 15.

In some embodiments, the UE 20 may obtain Cell IDs and merge these identifiers with available data from a database, e.g. similar to those in eNodeB's Tracking Area Updates. Once base station positions (X, Y, H) and associated $T_o$ values are known to the UE 20, In other embodiments, the UE 20 may obtain Cell IDs and merge these identifiers with available data from database, which scope may be similar to those as in case of eNodeB's Tracking Area Update scope, provided to the UE 20. Once eNodeBs positions (X, Y, H) and associated $T_0$ values are known to the UE 20, it may calculate the distance to each base station 10, 12, 14 from where any correctly decoded signal (frame or sub-frame) was received and can be linked to the given base station source.

The UE 20 may detect LTE broadcasted signals and calculate the T1 value, which is a time of reception of the transmission, send at the T0 time. As indicated, only ms:μs:ns part of absolute time is essential for the purpose of this method, with respect to a typical cell size. The ms part is added for frame or sub-frame indication. The UE 20, to calculate the distance to the base station 10, 12, 14 multiplies the speed of light constant by time difference between signal T1 and T0. Any delays relating to data processing at the UE site (dtUE) may be also compensated for in a similar way to those applied to the base stations 10, 12, 14 mentioned above. The accuracy of time source synchronization at the UE 20 may in this case be important to provide the UE position with desired accuracy and stability. The overall delay (dtUE) in data processing at UE 20 related to UE position measurement may have a different meaning that those presented in FIG. 7 for a base station 10, 12, 14. The UE 20 must decode received signals and determine from which eNodeB the given frame was received, as it may be in the coverage of many base stations. The UE 20 may latch the reception time of the given frame and use it for UE positioning, or it may compensate such delays by averaging, or using other means. The UE position may be calculated at the end of the data processing chain, possibly by some UE application or on chipset level, where the overall delay (dtUE) will be calculated and compensated for.

Also, the mobility of the UE 20 may have an impact on the quality of UE positioning. However, assuming typical UE movement velocity, or for simplicity assuming a UE velocity of 100 meters per second, in 10 milliseconds, which is a frame, the UE position may differ about 1 metre, which is not a significant deviation from the obtained position, and is below the accuracy of time measurement, which is approximately 30 meters. Therefore, the impact of above-mentioned limitation is not significant with respect to typical applications. It should be noted that UEs use TOA methods to determine the distance to the given base station, and it is not a problem if signals from another base station are received later, and/or are not synchronized with previous base station signals. The UE 20 may calculate the distance also to this second base station. The overall impact of a lack of synchronization between the base station may result in higher dilution of the UE position precision, as shown in FIG. 3. If all measurements relating to UE positioning are performed in a relatively short time, i.e. in 1 second, any lack of synchronization is generally not a problem.

The accuracy of the embodiments herein may also depend on the relative UE position within a base station constellation, which may result in a different shape of position, as indicated in FIG. 3

In the case of multipath propagation, the signal received first reflects the distance to the base station.

Figure 9:
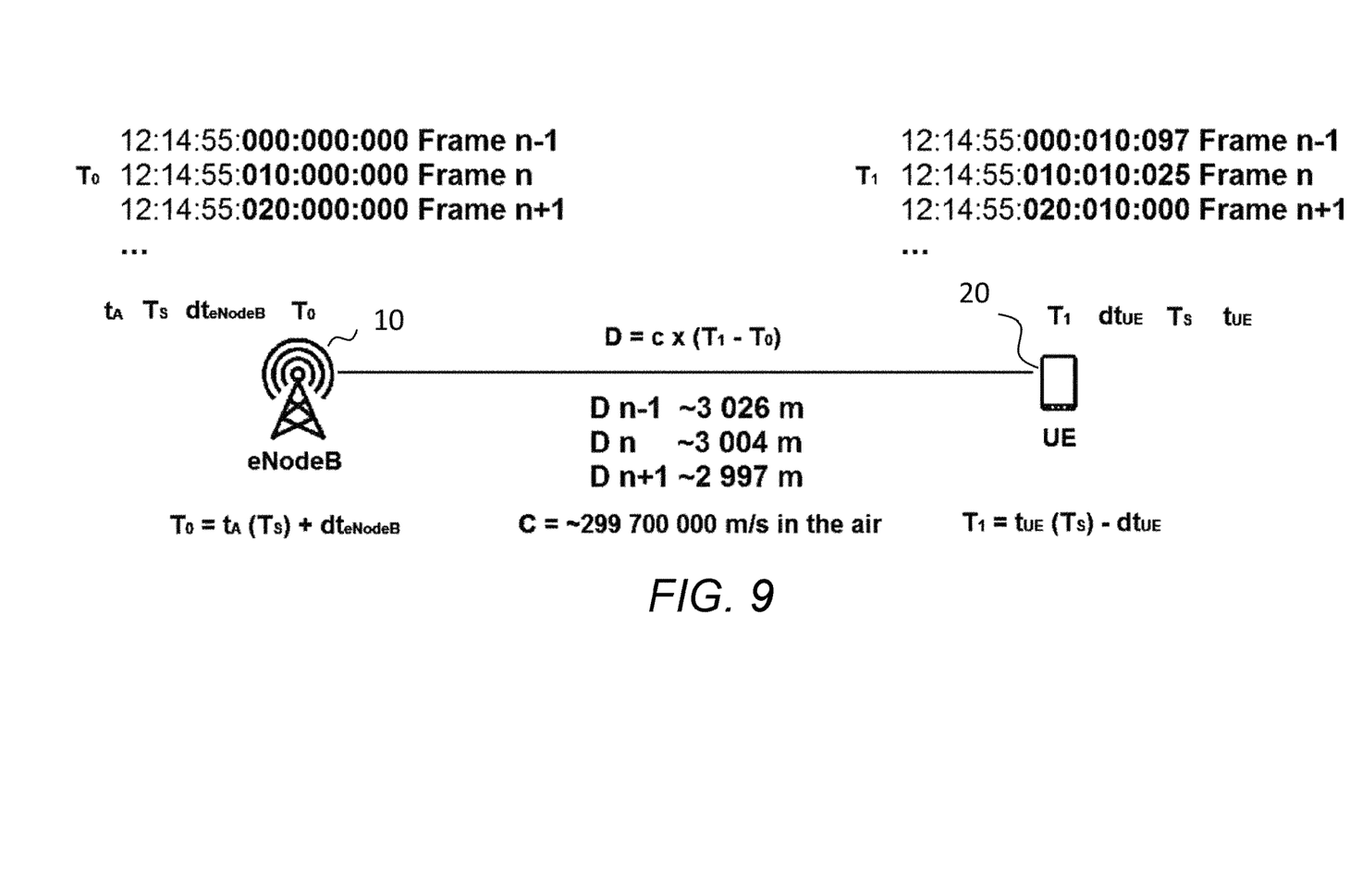
FIG. 9 is a schematic diagram of a user equipment and base station, useful for understanding a calibration process according to example embodiments.

Referring now to FIG. 9, methods of calibration and distance of UE 20 to base station calculations will now be described in accordance with example embodiments.

As described above, the proposed methods are based on knowledge of the exact time ($T_o$) of physical transmission of a given frame and the time (T1) of reception at the UE 20.

The base stations work in a relatively continuous manner, i.e. broadcasting transmissions with a known pattern. The UE 20 may be synchronised to the transmission by broadcast PSS/SSS signals. This assures LTE frame to frame synchronisation with accuracy proportional to Ts. To determine $T_o$, the correction factor dteNodeB is added to reflect any delays between the point (e.g. point A in FIG. 7) from where a real-time sample was taken (tA). This sample may be triggered by a certain Ts value which may reflect frame size; for the same purpose, this method may use, or be synchronised with any possible trigger signal which may have a repetitive nature, e.g. a frame or sub-frame trigger. Correction factor dteNodeB should reflect this.

Practically speaking, dteNodeB may be determined by internal measurement or during field testing. As shown in FIG. 9, if the distance between the UE 20 and the base station is known, e.g. 2997 metres, it may be possible to determine the theoretical TOA, e.g. 10 μs based on the distance and speed of light constant. Additional measured delay may reflect dteNodeB. In current base station systems, real time data is included in transmissions but sent without correction related to further processing delay and physical transmission. Downlink transmission may take up to 1 ms but for example embodiments herein, dteNodeB may be measured with higher accuracy. The downlink transmission delay, even if 1 ms, may not determine the overall accuracy of embodiments due to stability.

Therefore, $T_o$ is a function of Ts, and so the accuracy of real time measurement at the reference point A is assured. To determine $T_o$, the delay dteNodeB is added to the real time sample value at point A (tA). The distance D traveled by a radio frame may be calculated by multiplying the speed of light (c) by the time different ($T_1$-$T_o$) as indicated in FIG. 9 which may be used for calibration of the base station.

At the UE 20, the situation is different as the UE cannot take only a frame arrival time to obtain the value of $T_1$; additional processing is needed. The UE 20 may be synchronised in a similar way to the base station with a real time synchronisation sources, which provides the time value tUE. The UE 20 may determine that the received signal comes from a particular base station; this requires previous synchronisation and additionally some processing time referred to as dtUE, which generally depends on the method as to how the UE position will be calculated, e.g. by a chipset or application. In either case, the dtUE delay may be calculated with respect to internal signaling or field tests. Example embodiments do not require communications or acknowledgments to the base station, and so it may be assumed that the UE 20 receives signals from at least three base stations.

As the dtUE delay reflects processing at the UE 20, the $T_1$ value used in distance measurement should take the delay into account and dtUE should be subtracted from $T_1$.

It should be noted that LTE/5G frames are given as one example, but in fact any signal or symbol transmitted by a radio interface with a known repetitive pattern, such as MIB or SIB signaling, may be used, with appropriate time corrections.

As may also be observed in FIG. 9, the base station and UE 20 may use a reference time synchronization signal source, which in general may be UTC time provided by a GPS system. The base station and the UE 20 may not be synched, and even if they may be triggered by high accuracy Ts time stamp, some discrepancy may be observed due to time reference source accuracy.

In summary, example MTOA methods for UE positioning may employ both base station and UE calibration operations to determine the real time of frame transmission and frame reception. It may be assumed that both dteNodeB and dtUE are stable, as frame to frame synchronization is guaranteed by LTE/5G standard. As such, both delays may be compensated appropriately.

Once the UE 20 determines its position using embodiments described herein, the UE may optimize its behaviour or performance, because the UE position may be used as an additional factor in a decision-making process. To illustrate this process, FIG. 10 shows a typical UE position calculation process.

Example embodiments described herein may be used for, for example:
  optimization of eNodeB serving cell selection;
  optimization of radio resources allocation;
  optimization of emergency UE positioning;
  UE positioning for Area Based Services;
  GPS receiver replacement, redundancy or substitution;
  Independence from GPS positioning source, i.e. used for position confirmation;
  UE positioning without significant mobile network engagement;
  Obtaining UE position using mobile network signaling but without network knowledge about obtained by UE position;
  UE position and/or speed tracking and prediction without engagement of the mobile network, as all measurement may be done entirely by UE.

Figures 10, 11:
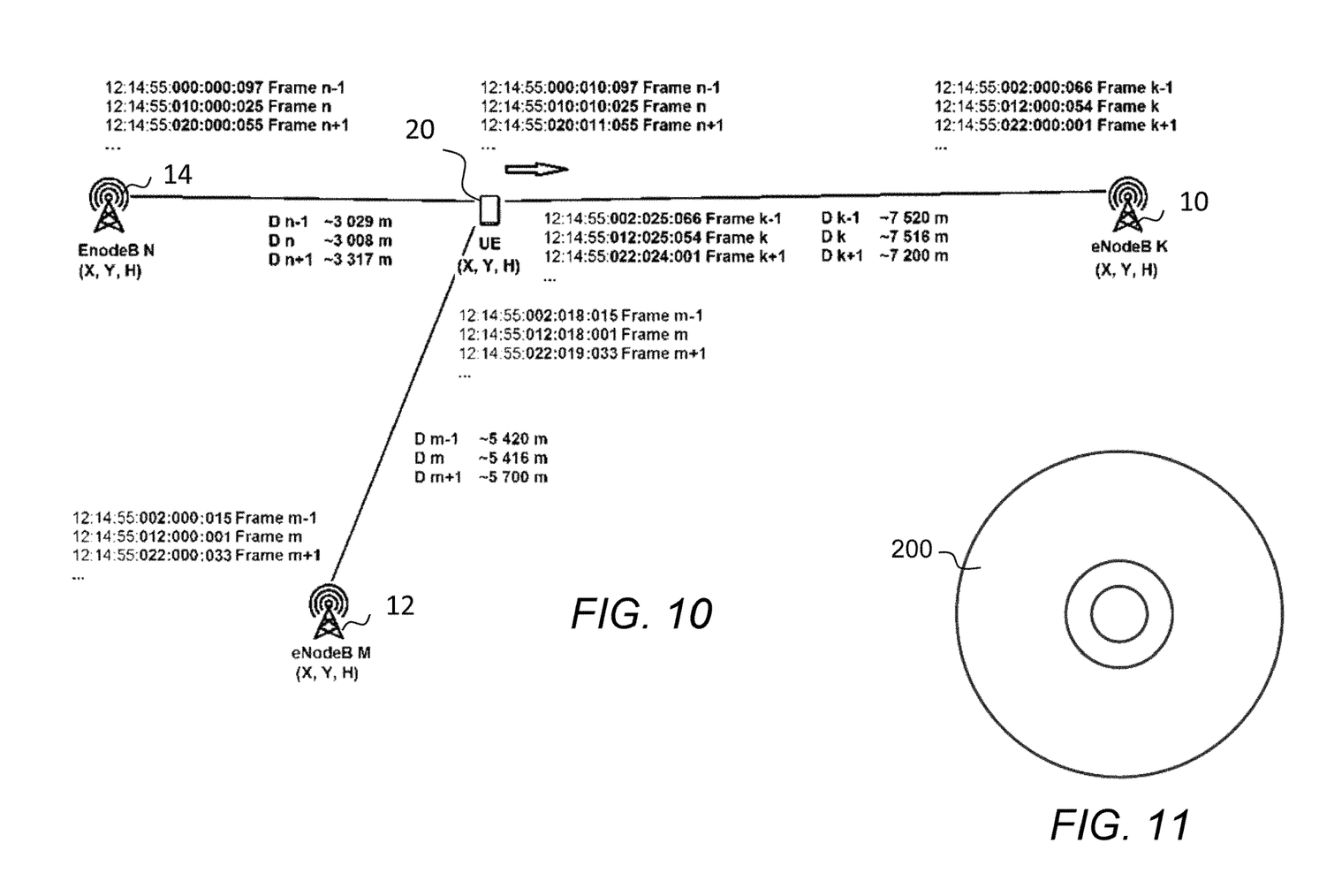
FIG. 10 is a schematic diagram of a user equipment in relation to three base stations, useful for understanding an application of position determination according to example embodiments.
FIG. 11 shows a non-volatile media according to some embodiments.

As it may be seen on FIG. 10, for each base station in the vicinity of the UE 20, the UE may perform a set of measurements based on TOA principles. Once the base station antenna positions and time of frame emissions are obtained, passive observation of signaling and its decoding may be sufficient for positioning. This assumption is valid as LTE/5G frame to frame time relation are stabile with an accuracy of the base time unit Ts.

Some discrepancies may be observed due to instability of reference time source (e.g. for Frames n−1 and n) or due to UE mobility (Frame n, Frame n+1). Distance (time) measurements from other sources may indicate the cause. Additionally, a path may be indicated, and a future position of UE 20 may be predicted. All measurements and knowledge about the UE's current and/or future position may be performed locally by UE 20 and the mobile network may not be aware of that.

With respect to scenario shown on FIG. 10, the UE 20 may determine, based on its position and the base station antenna position, that a first base station (eNodeB K) should be selected for provision of a connection (switch to RRC_CONNECTED state) or used in case of handover, even if the eNodeB K signal power may not be the highest with respect to second and third base stations (eNodeB M and eNodeB N). Justification for this selection may that UE 20 is approaching the first base station (eNodeB K) and it may be assumed that quality of connection will be increasing. In such a case, some additional handovers may be omitted, like in case when the UE chooses the second or third base stations (eNodeB M or eNodeB N) to establish the connection. In current applications, selection based on signal power and quality of connection represent by CSI/CQI values and UE position may not be taken into account.

As the UE position may be easily obtained and is almost always available (assuming relevant cell coverage is provided), the UE 20 may provide its position, and base station, and based on that knowledge may optimize allocation of radio resources. In a practical application, cell performance is environmental dependent and obstacles such as buildings may limit propagation or provide attenuation. Using UE position data, a base station may identify such events and optimize its performance to handle such a situation, for example by changing its transmission pattern (using MIMO, spatial multiplexing, beamforming, increase power etc.) or change the quality of connection (e.g. CQI value).

Another practical application of example embodiments is discreet UE positioning, where the mobile network cannot localize the given UE 20 with certain level of accuracy. Some users do not wish to be tracked by their UE 20 and data about their activities revealed to the network. This group may include users who disable localization services and/or GPS receivers in their UEs. There are also UEs (smartphones) without built-in GPS receivers for users. Example embodiments offer the possibility of providing a UE's position for the user's convenience only, e.g. for Area Based Services allowed or enabled directly according to the user's preference. In this case, no information about the user's position will be exposed to the mobile network.

Example embodiments may be considered a substitute of a conventional GPS system. Example embodiments may be also used by UEs for independent UE positioning, to act as separate positioning system. In case of GPS failure or malfunction, any discrepancies above a tolerance limit may indicate some problems related to GPS, beyond user control, and due to ranges may be more affected by phenomena such solar flares or, more probably, interference or jamming of GPS signals. As example embodiments are based on local signaling from surrounding base stations, such negative effects may not be observed or may be reduced, Additionally, if both GPS and example embodiments are used for provision of UE position, the obtained position may be more accurate and, additionally, independently confirmed. This possibility may be essential in some applications, where trust in the UE position is a must, which may be in case of airborne vehicle positioning and related safety nets, navigation aids or directions, or required by legal requirements.

Example embodiments do not require interaction or co-operation with a mobile network and do not use its resources (apart from its broadcasting of relevant data—SIB15). This means that example embodiments are more practicable in usage and implementation. Example embodiments also require one less base station than the traditional OTDOA method to provide a similar level of service, which at the edges of the network coverage may be essential.

Additionally, because example embodiments do not require an active connection with the network or to radio resources or processing time of the mobile network, there is no problem with multiple UE positioning, where many UEs in the coverage wish to obtain their respective positions.

Additionally, in 112/911/999 emergency positioning, when users make a call, the UE position may be provided even if GPS or GNSS positioning is not available.

FIG. 11 shows a non-transitory media 200 according to some embodiments. The non-transitory media 200 is a computer readable storage medium. It may be e.g. a CD, a DVD, a USB stick, a blue ray disk, etc. The non-transitory media 200 stores computer program code causing an apparatus to perform the method of FIG. 5 and/or FIG. 6 when executed by a processor such as processor 100 of FIG. 4.

Other embodiments may comprise a terminal of, or associated with, a network operator, which terminal sends a request for the position of one or more user equipment according to example embodiments herein. Other embodiments may comprise said user equipment being configured either to allow or deny the request, which may be determined selectively by the user or settings of the user equipment.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. A method, comprising:
receiving at an apparatus from each of at least three remote base stations of a communication network transmitted data comprising a portion indicating the geographic position and a transmission time of a reference signal or data of each respective base station of the at least three remote base stations; and
determining the geographic position of the apparatus with respect to each of the at least three remote base stations based on calculating distances between the geographic position of the apparatus with respect to each of the at least three remote base stations,
wherein the calculating is using respective time delays between the transmission time and a reception time of the reference signal or data and determined intersection points of said calculated distances between the geographic position of the apparatus and each of the at least three remote base stations,
wherein the determination of the intersection points of said calculated distances is in two-dimensions or three-dimensions such that determination of the geographic position is made without sending data to the communication network, and
wherein the geographic position of each of the at least three remote base stations refers to the position of one or more antennas on or associated with a respective base station of the at least three remote base stations.

2. The method of claim 1, wherein the geographic position determining is configured to determine distances in two-dimensions from at least a first, a second and a third base station of the at least three remote base stations, wherein the determining is using at least:

$$Dk = c \cdot (T_1^k - T_0^k);$$

$$Dm = c \cdot (T_1^m - T_0^m);\text{ and}$$

$$Dn = c \cdot (T_1^n - T_0^n),$$

wherein c is the speed of light, and wherein $T_0^k$, $T_0^m$, and $T_0^n$ comprise a time of physical transmission of data and $T_1^k$, $T_1^m$, and $T_1^n$ comprise a time of physical reception of the data by the apparatus from the at least three remote base stations.

3. The method of claim 1, wherein the geographic position of each respective base station is received in a radio frame or sub-frame or commonly agreed reference symbol of repetitive nature.

4. The method of claim 3, wherein the radio frame or sub-frame is one of a LTE, 5G or subsequent-generation radio frame.

5. The method of claim 1, wherein the transmission time indicates the physical transmission time of said portion from the respective base station.

6. The method of claim 5, wherein the physical transmission time is determined based on an absolute reference time at the respective base station modified by a delay time to account for processing at the respective base station.

7. The method of claim 1, wherein the reception time of the transmitted data indicates the physical reception time at the apparatus.

8. The method of claim 1, wherein the transmitted data is received in a system information block.

9. The method of claim 1, wherein the transmitted data is received from a broadcast signal issued by the respective base stations.

10. A non-transitory computer readable medium comprising program instructions stored thereon for performing a method, comprising:
    receiving at an apparatus from each of at least three remote base stations of a communication network transmitted data comprising a portion indicating the geographic position, and a transmission time of a reference signal or data of each respective base station of the at least three remote base stations; and
    determining the geographic position of the apparatus with respect to each of the at least three remote base stations based on calculating distances between the geographic position of the apparatus with respect to each of the at least three remote base stations,
    wherein the calculating is using respective time delays between the transmission time and a reception time of the reference signal or data and determined intersection points of said calculated distances between the geographic position of the apparatus and each of the at least three remote base stations,
    wherein the determination of the intersection points of said calculated distances is in two-dimensions or three-dimensions such that determination of the geographic position is made without sending data to the communication network, and
    wherein the geographic position of each of the at least three remote base stations refers to the position of one or more antennas on or associated with a respective base station of the at least three remote base stations.

11. The apparatus of claim 10, wherein the transmission time indicates the physical transmission time of said reference signal or data from the respective base station.

12. The apparatus of claim 11, wherein the physical transmission time is determined based on an absolute reference time at the respective base station modified by a delay time to account for processing at the respective base station.

13. An apparatus comprising:
    at least one processor; and
    at least one non-transitory memory storing instructions that when executed by the at least one processor, causes the apparatus:
    to receive at an apparatus of a communication network from each of at least three remote base stations transmitted data comprising a portion indicating the geographic position, and a transmission time of a reference signal or data of each respective base station of the at least three remote base stations,
    to determine the geographic position of the apparatus with respect to each of the at least three remote base stations based on calculating distances between the geographic position of the apparatus with respect to each of the at least three remote base stations,
    wherein the calculating is using respective time delays between the transmission time and a reception time of the reference signal or data and determined intersection points of said calculated distances between the geographic position of the apparatus and each of the at least three remote base stations, and
    wherein the determination of the intersection points of said calculated distances is in two-dimensions or three-dimensions such that determination of the geographic position is made without sending data to the communication network, and
    wherein the geographic position of each of the at least three remote base stations refers to the position of one or more antennas on or associated with a respective base station of the at least three remote base stations.

14. The apparatus of claim 13, wherein the geographic position determining is configured to determine distances in two-dimensions from at least a first, a second and a third base station of the at least three remote base stations, wherein the determining is using at least:

$$Dk = c \cdot (T_1^k - T_0^k);$$

$$Dm = c \cdot (T_1^m - T_0^m); \text{ and}$$

$$Dn = c \cdot (T_1^n - T_0^n),$$

wherein c is the speed of light, and wherein $T_0^k$, $T_0^m$, and $T_0^n$ comprise a time of physical transmission of data and $T_1^k$, $T_1^m$, and $T_1^n$ comprise a time of physical reception of the data by the apparatus from the at least three remote base stations.

15. The apparatus of claim 13 further configured to receive the geographic position of each respective base station in a radio frame or sub-frame or commonly agreed reference symbol of repetitive nature.

16. The apparatus of claim 15, wherein the radio frame or sub-frame is one of a LTE, 5G or subsequent-generation radio frame.

17. The apparatus of claim 13, wherein the reception time of the transmitted data indicates the physical reception time at the apparatus.

18. The apparatus of claim 17, wherein the physical reception time is determined based on an absolute reference time at the user equipment modified by a delay time to account for processing at the apparatus.

19. The apparatus of claim 13 wherein the at least one non-transitory memory storing instructions is configured with the at least one processor to cause the apparatus to receive the transmitted data in a system information block.

20. The apparatus of claim 13 wherein the at least one non-transitory memory including the computer program code is configured with the at least one processor to cause the apparatus to receive the transmitted data from a broadcast signal issued by the respective base stations.

* * * * *